United States Patent
Baird et al.

(10) Patent No.: US 7,539,179 B1
(45) Date of Patent: May 26, 2009

(54) SCALABLE PACKET-SWITCHED CALL CONTROL SIGNALING

(75) Inventors: Randall Baird, Austin, TX (US); Leo Nieuwesteeg, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/409,922

(22) Filed: Sep. 30, 1999

(51) Int. Cl.
*H04L 12/66* (2006.01)

(52) U.S. Cl. ...................... 370/356; 370/401

(58) Field of Classification Search ................. 370/467, 370/352, 353, 356, 389, 400, 401, 410, 465, 370/466, 475, 355, 402
See application file for complete search history.

(56) References Cited

U.S. PATENT DOCUMENTS

| | | | |
|---|---|---|---|
| 6,259,691 B1 * | 7/2001 | Naudus | 370/352 |
| 6,374,302 B1 * | 4/2002 | Galasso et al. | 709/238 |
| 6,445,695 B1 * | 9/2002 | Christie, IV | 370/352 |
| 6,449,259 B1 * | 9/2002 | Allain et al. | 370/253 |
| 6,449,260 B1 * | 9/2002 | Sassin et al. | 370/270 |
| 6,483,912 B1 * | 11/2002 | Kalmanek et al. | 379/219 |
| 6,614,781 B1 * | 9/2003 | Elliott et al. | 370/352 |
| 6,650,619 B1 * | 11/2003 | Schuster et al. | 370/230 |
| 6,674,713 B1 * | 1/2004 | Berg et al. | 370/217 |
| 6,680,952 B1 * | 1/2004 | Berg et al. | 370/467 |
| 6,693,874 B1 * | 2/2004 | Shaffer et al. | 370/217 |
| 6,711,166 B1 * | 3/2004 | Amir et al. | 370/395.1 |
| 6,826,272 B1 * | 11/2004 | Dalrymple et al. | 379/220.01 |
| 6,842,447 B1 * | 1/2005 | Cannon | 370/352 |
| 6,856,676 B1 * | 2/2005 | Pirot et al. | 379/201.01 |
| 6,888,803 B1 * | 5/2005 | Gentry et al. | 370/259 |

OTHER PUBLICATIONS

Lyndon Ong et al., Framework Architecture for Signaling Transport, Jun. 1999, IETF Internet-Draft.*
D. Auerbach et al., Session Manager, Feb. 25, 1999, IETF Internet-Draft.*
D. Auerbach et al., Signaling Backhaul Protocol, Feb. 25, 1999, IETF Internet-Draft.*
Draft H.323, Jan. 30, 1996, Telecommunication Standardization Sector of ITU (ITU-T).*

* cited by examiner

*Primary Examiner*—Firmin Backer
*Assistant Examiner*—Toan D Nguyen
(74) *Attorney, Agent, or Firm*—Stolowitz Ford Cowger, LLP (57) ABSTRACT

A packet-switched communication system, method for controlling packet-switched calls over such a system, and components of the system are disclosed. In one embodiment, the system provides a scalable implementation for handling H.323 calls. The H.323-required TCP signaling terminations are handled by distributed signaling gateways. Each signaling gateway backhauls the signaling content from these terminations to a central media gateway controller for processing. The media gateway controller uses an efficient gateway control protocol to control media gateways and/or media proxies that actually handle the media bearer channels associated with the backhauled H.323 signaling connections. The H.323 complexity can thus be concentrated in the media gateway controller, without requiring full H.323 functionality at the distributed gateways. Also, because the TCP signaling connections are remote from the media gateway controller, H.323 signaling redundancy can be provided at the media gateway controller.

58 Claims, 9 Drawing Sheets

SCALABLE PACKET-SWITCHED CALL CONTROL SIGNALING

FIELD OF THE INVENTION

This invention pertains generally to packet-switched telecommunications, and more particularly to methods and systems for handling packet-switched call control signaling for multiple connections.

BACKGROUND OF THE INVENTION

H.323 is a standard promulgated by the International Telecommunications Union (ITU) for multimedia communications over local-area networks (LANs) utilizing Internet Protocol (IP) or another packet-switched medium. The H.323 standard is attractive, for one, because it is a flexible standard appearing in a field dominated by proprietary designs that offer little hope for interoperability between different vendor's equipment. Thus, H.323 offers the hope of a world where different vendor's equipment and different carrier's networks can and will communicate seamlessly. The H.323 standard is also attractive because it allows an administrator some measure of control over the amount of voice, video, and other multimedia traffic traversing a packet-switched network that has no other quality-of-service guarantees.

H.323 defines several components for a packet-switched network-based communications system—these components include Terminals, Gateways, and Gatekeepers. Terminals are client endpoints that provide multimedia communications to a user. Every H.323-compliant terminal must provide for voice communication, and may provide for video and/or data also. Gateways are also specified by H.323—a gateway provides data and signaling translation, allowing an H.323 compliant-terminal to communicate with a second, non-H.323-compliant device. For example, some gateways translate H.323 voice streams into a format understood by a switched-circuit network (SCN), such as ISDN, T1 or E1 TDM carrier formats, or even analog. Gatekeepers perform call control for calls within their zone of operation. Gatekeeper call control functions can include address translation and directory services, admissions control, bandwidth management, and call signaling.

Figure 1:
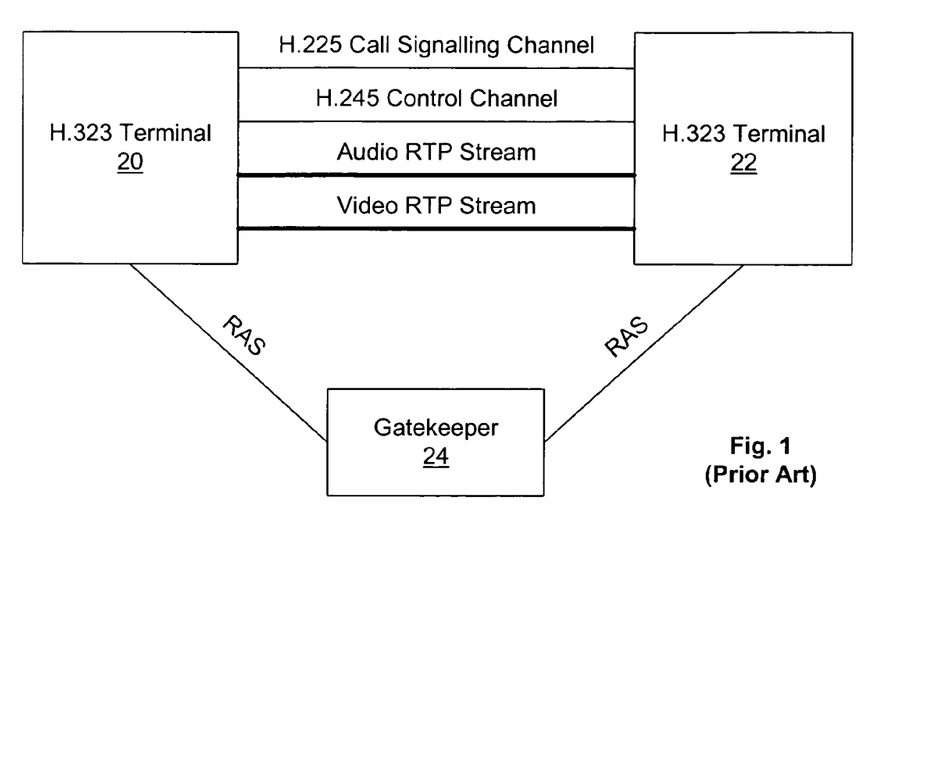
FIGS. 1, 2, and 3 illustrate several prior-art possibilities for connecting two H.323-compliant terminals.

FIG. 1 shows connection paths for a version 1 H.323 video call that originates and terminates within a common zone controlled by gatekeeper 24. H.323 terminal 20 communicates with gatekeeper 24 using Registration/Admission/Status (RAS) protocol, and requests a connection to a second H.323 terminal 22. The gatekeeper 24 uses direct signaling, i.e., it only handles the RAS channel. Gatekeeper 24 checks the status of terminal 22, and if the terminal (and sufficient bandwidth) are available, grants terminal 20's request by giving it the address of terminal 22.

To make the connection, terminal 20 attempts to open a TCP/IP connection to terminal 22 to establish the H.225 call signaling channel. The H.225 call signaling channel uses Q.931 commands over TCP, enhanced with H.225-specific user-to-user information elements (UUIEs) to provide basic call functionality. Terminal 22 first checks with gatekeeper 24, using RAS, for permission to answer the call. If permission is granted, further elements of the call are set up.

Next, the H.245 control channel requires a TCP/IP connection between terminals 20 and 22 (with H.323 version 2, Q.931 and H.245 signaling can in some cases share a TCP/IP connection). H.323 entities use the H.245 control channel to orchestrate the H.323 session. This includes functions such as exchanging audio and video capabilities, opening and closing logical channels, requesting preferences, issuing flow control messages, and reselecting codecs.

Information-bearing (bearer) streams are set up, using H.245 signaling, as logical channels that can be set up and torn down during the duration of the call. For instance, connectionless audio and video bearer streams are established using Real-time Transport Protocol (RTP) streaming and UDP.

Figure 2:
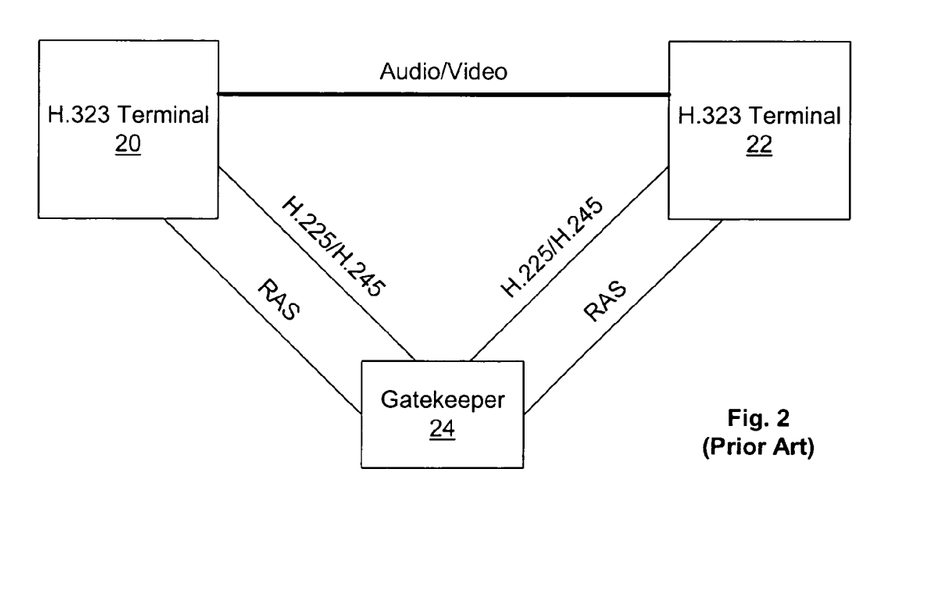

H.323 does not require that H.225 and H.245 control signaling be directed to the same entity that the bearer streams are directed to. This allows third-party call control to be implemented by routing the control signaling through an intermediate call agent. For instance, gatekeeper 24 can instruct terminals 20 and 22 to connect their signaling channels through the gatekeeper (see FIG. 2). Gatekeeper 24 can then control and modify call signaling without affecting the associated bearer streams, which can flow directly between the endpoints.

Figure 3:
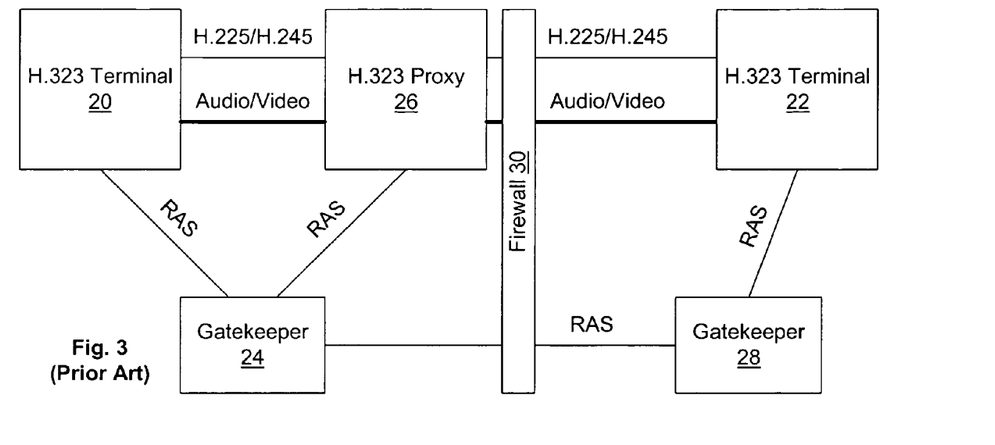

FIG. 3 shows an alternate third-party control scheme that is particularly useful for preventing outside parties from gaining unauthorized visibility into an internal network. Terminal 20, which lies within firewall 30, requests a connection to terminal 22, which lies outside the firewall. Gatekeeper 24 instructs terminal 20 to connect its signaling and media streams to proxy 26, and instructs proxy 26 to connect in turn to terminal 22. Proxy 26 prevents terminal 22 or gatekeeper 28 from gaining knowledge of the internal structure of the network behind firewall 30. A proxy may also modify media streams passing through it, if such is required.

Figure 4:
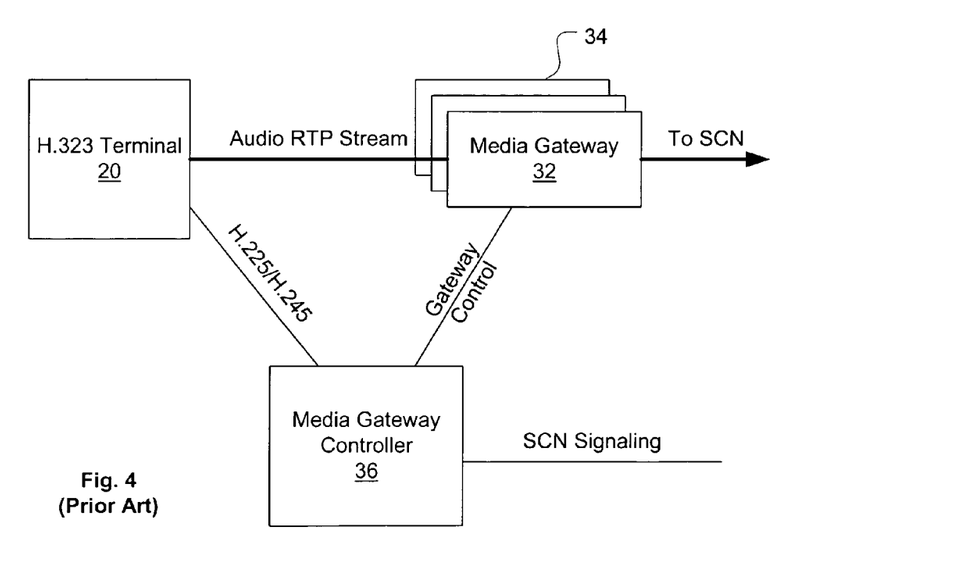
FIG. 4 illustrates a prior-art connection between an H.323-compliant terminal and a media gateway.

FIG. 4 illustrates yet another arrangement that is possible with H.323. Media gateway 32 (shown as part of a bank of gateways 34) has the capability to convert between, e.g., an audio RTP stream and a TDM pulse-code modulated format, such as T1, used by an attached SCN. Gateway 32 is adapted to handle multiple such call conversions based on commands issued by a media gateway controller 36.

Media gateway controller efficiently manages gateway bank 34 by handling call control signaling. Thus, a gatekeeper (not shown) instructs terminal 20 to complete its H.225/H.245 TCP/IP connections with media gateway controller 36. Controller 36 interprets and originates H.225/H.245 signaling for terminal 20. Controller 36 also directs media gateway 32 to emit H.323-compliant streams to terminal 20. Typically, media gateway controller 36 will handle directly call signaling with the SCN network also.

SUMMARY OF THE INVENTION

The disclosed embodiments of the present invention overcome several shortcomings of a network design such as the one shown in FIG. 4. First, although a media gateway controller may have the internal capability to control hundreds of thousands or even millions of calls simultaneously, it may be able to handle only a few thousand H.323 calls. This is because each H.323 call requires up to two TCP signaling connections, such that H.323 calls consume the available TCP connections on a typical gateway controller platform long before the controller's internal call processing limitations are reached. (Even in the limit, TCP only allows 65,535 connections due to the use of a 16-bit port address field.) Second, dropped TCP signaling packets from some H.323 calls may block the transmission of a large number of signaling packets from other H.323 calls, creating undesirable signaling delay conditions. And third, TCP provides no failover mechanism, resulting in an H.323 call being dropped if one of its TCP signaling connections is broken. This situation is particularly troublesome when a media gateway controller handling a large number of H.323 calls drops all of its TCP connections, resulting in all of the H.323 calls and the media streams associated with them being dropped.

The present disclosure includes a recognition of the problems identified above, and solutions to each. Applied specifically to H.323 v1 and v2, the invention provides for terminating H.323-required TCP connections for multiple calls at one or more signaling gateways separate from a media gateway controller. A signaling gateway preferably multiplexes the signaling carried on multiple TCP connections onto a small number of sessions (as few as one) between the media gateway controller and the signaling gateway. Also preferably, communications over this small number of sessions uses a transport mechanism other than TCP, such as RUDP (Reliable User Datagram Protocol) or SCTP (Signaling Control Transport Protocol). With RUDP, a delay at one signaling gateway need not block transmission from other signaling gateways. Also, a delay in the protocol data units (PDUs) of one call transported over RUDP will not result in subsequent PDUs from other calls being delayed. Separating the call signaling TCP connections from the media gateway controller also allows a media gateway control network to include a failover controller capability that is otherwise missing.

In one aspect of the invention, a packet-switched communication system is disclosed. The system comprises multiple signaling gateways, each signaling gateway capable of terminating multiple packet-switched call signaling connections (each call signaling connection corresponds to a particular packet-switched call). Each signaling gateway multiplexes the signaling content of the call signaling connections it serves onto a single session, or a small number of sessions.

The system further comprises multiple media endpoints, each endpoint capable of terminating multiple packet-switched bearer streams, and a primary media gateway controller. The media gateway controller communicates with each of the signaling gateways and each of the media endpoints, and uses the multiplexed signaling content received from the signaling gateways to control operation of the media endpoints.

In another aspect of the invention, a method of controlling packet-switched calls is disclosed. Multiple packet-switched call signaling connections, each corresponding to a particular packet-switched call, are terminated at a packet-switched signaling gateway. The packet-switched signaling gateway communicates, preferably over a single session or a small number of sessions, the signaling content of the call signaling connections to a primary media gateway controller. And the packet-switched bearer streams corresponding to the packet-switched call signaling connections are each routed to a media endpoint controlled by the media gateway controller.

A packet-switched signaling gateway is also disclosed. The gateway comprises means for terminating multiple packet-switched call signaling connections, and means for multiplexing the signaling content received over the multiple packet-switched call signaling connections onto a single session, or a small number of sessions, for transmission to a media gateway controller. The signaling gateway may be co-resident with a media endpoint in a common platform.

A media gateway controller is also disclosed. The gateway controller comprises means for receiving multiplexed signaling content from a signaling gateway and parsing this content into signaling content associated with identifiable packet-switched call signaling connections. The controller also comprises means for sending, for signaling content associated with one of the identifiable call signaling connections, gateway control signaling responsive to that signaling content to a media termination endpoint handling a packet-switched bearer stream associated with that identifiable call-signaling connection.

BRIEF DESCRIPTION OF THE DRAWING

The invention may be best understood by reading the disclosure with reference to the drawing, wherein.

DETAILED DESCRIPTION OF THE PREFERRED EMBODIMENTS

Several terms in this disclosure have defined meanings. A packet-switched call is an audio transmission that, at least over the portion of its transmission length relevant to this invention, travels as a series of datagrams over a packet-switched network. The transmission may also involve video or other data. A call signaling connection is used to communicate signaling traffic related to a call, using a connection-oriented, reliable transport (e.g., TCP), over a packet-switched datagram medium (e.g., IP).

A media endpoint processes media bearer streams received at its boundaries—this processing may involve translation of a stream between two formats, or retransmission in the same format. A media gateway is a media endpoint that translates media bearer streams between a packet-switched format and some other format. A media proxy is a media endpoint that translates and/or retransmits packet-switched media bearer streams in a packet-switched format. A media gateway controller controls one or more media endpoints by handling signaling associated with the packet-switched media streams passing through a media endpoint, and issuing consistent control commands to that endpoint.

Although the preferred embodiments refer to H.323 and H.323-specific signaling, these references are merely exemplary. The invention can be applied to other packet-switched communication formats that use per-call signaling connections. For purposes of this disclosure, an "H.323 endpoint" includes any device or collection of devices that appears to an H.323-compliant device to be an H.323-compliant media-streaming device. This includes H.323 terminals, H.323 media gateways, H.323 media proxies, H.323 terminals with H.323 gatekeepers handling associated signaling, media gateway controllers with H.323 signaling, or any combination thereof, and various embodiments of the present invention.

Figure 5:
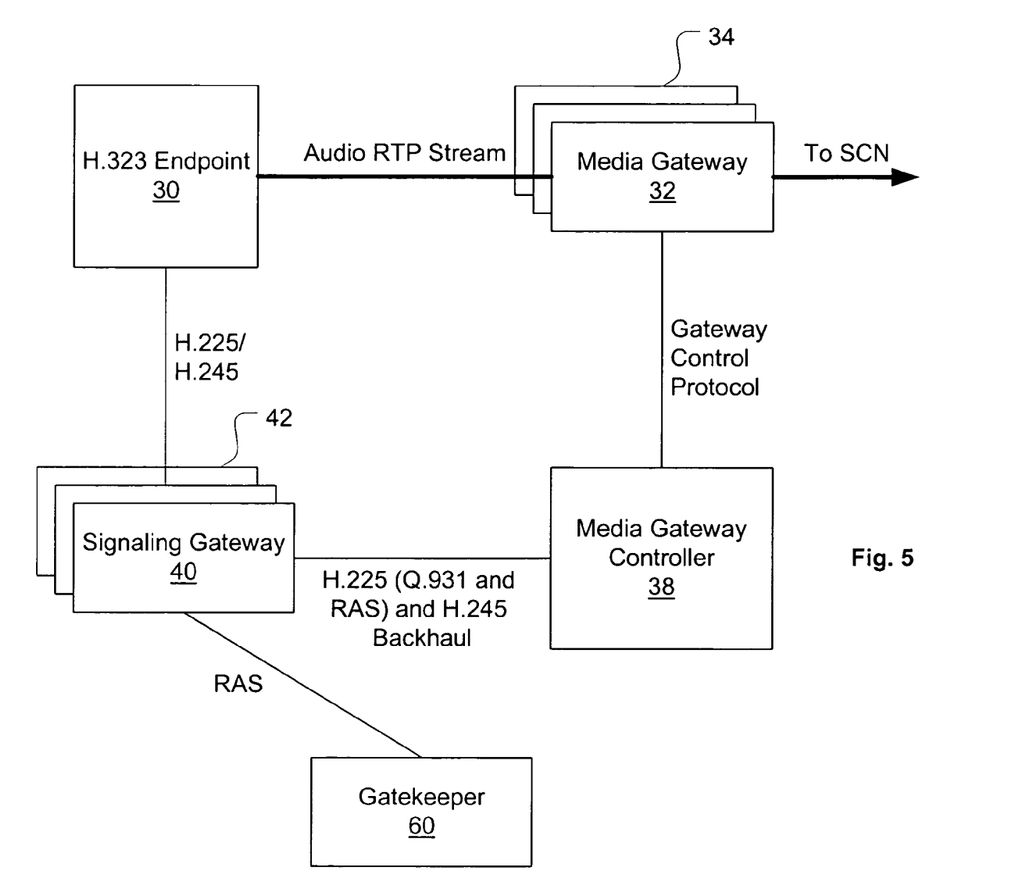
FIG. 5 illustrates a connection between an H.323-compliant endpoint and a media gateway according to one embodiment of the invention using H.323 backhaul.

Referring to FIG. 5, a first embodiment of the invention is depicted. Prior to call setup, media gateway controller (MGC)

38 instructs signaling gateway 40, via RAS backhaul, to register with gatekeeper 60, using the standard RAS protocol.

In one H.323 operation, a call can be set up from endpoint 30. During H.323 call setup for endpoint 30, endpoint 30 sends a RAS admission request (ARQ) to gatekeeper 60, which results in gatekeeper 60 returning an admission confirm (ACF) that informs endpoint 30 that signaling gateway 40 (e.g., one of a bank of signaling gateways 42) is to be used to connect H.225 and H.245 signaling. When endpoint 30 establishes H.225 and H.245 connections with signaling gateway 40, signaling gateway 40 passes the signaling content it receives (over the peered H.225 and H.245 signaling connections), using a backhaul channel, to media gateway controller 38. Media gateway controller 38 interprets the H.225 and H.245 signaling, and responds by: returning response signal content to signaling gateway 40; issuing appropriate gateway control commands to media gateway 32; and/or exchanging signaling with the SCN. Each step executed by signaling gateway 40 or media gateway controller 38 will be examined below in detail.

In an analogous H.323 operation, the media gateway controller/signaling gateway can originate a call. In this case, the media gateway controller 38 uses the H.225 backhaul to request that the signaling gateway 40 initiate a RAS admission request with the gatekeeper 60. Gatekeeper 60 will then return an admission confirm (ACF), which contains the address of the endpoint 30 with which the H.225 Q.931 and H.245 signaling should be established, to the signaling gateway 40. This ACF information is in turn backhauled back to the media gateway controller 38, which then instructs the signaling gateway 40 to initiate H.225 and H.245 connections with endpoint 30. As further detailed description of this operation is largely duplicative of the case where endpoint 30 initiates the call, the detail below is generally applicable to a call initiated from either endpoint 30 or gateway 40/gateway controller 38. Signaling gateway 40 need not have the capability to understand any of the H.225 (Q.931 and/or RAS) and/or H.245 signaling content it receives from H.323 endpoint 30 or media gateway controller 38. For information received from H.323 endpoint 30, signaling gateway 40 merely performs common TCP tasks (e.g., TCP connection establishment, flow control, sequencing, error checking, retransmission, and receipt acknowledgment) for each connection. Gateway 40 places H.225/H.245 signaling content received from each of its H.323 connections on a queue for communication over a common backhaul session with media gateway controller 38 (note that more than one backhaul connection may be used, e.g., one for H.225 and another for H.245, and/or a division of the H.323 connections among several backhaul connections per signaling gateway).

The transport protocol used for the H.323 backhaul session is not critical to the invention, as long as signaling gateway 40 and media gateway controller 38 understand how to assemble and disassemble signaling content communicated between them. For example, each H.225 or H.245 message may be sent as a separate datagram (including some identification as to the H.323 call associated with the message). Or several messages may be concatenated in a common datagram for backhaul transmission. The transport protocol used for the backhaul session is preferably a reliable protocol, such as TCP, SCTP, or RUDP. Optionally, the backhaul protocol may provide its own error checking/retransmission capabilities, and utilize an unreliable transport protocol such as UDP.

When media gateway controller 38 parses the signaling content it receives over the backhaul channel, it associates each message with its H.323 call. The gateway controller 38 then interprets each message under the appropriate protocol, operating as an H.323-compliant signaling receiver. Gateway controller 38 then takes appropriate actions in response to this interpretation.

Some messages received from H.323 endpoint 30 may require that a response be sent back to endpoint 30 (e.g., a response to a request to open or close a media logical channel). If such a response is required, gateway controller 38 passes the signaling content of the required message back to gateway 40, along with an indication that the message is to be sent, e.g., over endpoint 30's H.245 signaling connection. Signaling gateway 40 parses this message off of the backhaul channel and places it in the appropriate TCP transmission queue.

Some messages received from H.323 endpoint 30 may require translation and forwarding to other call signaling elements, e.g., a switch located in the SCN. Gateway controller 38 performs these functions, either alone, or in conjunction with one or more signaling gateways that interface SCN signaling protocols (e.g., SS7, ISDN, DPNSS) with a packet-switched network.

Finally, some messages received from H.323 endpoint 30 may require configuration within media gateway 32. Preferably, media gateway controller 38 communicates with media gateway 32 (and gateway bank 34) using an efficient gateway control protocol such as SGCP (Simple Gateway Control Protocol), MGCP (Media Gateway Control Protocol), or the MEGACO (MEdia GAteway COntrol) Protocol (see INTERNET DRAFT, MEGACO Protocol Proposal, Internet Engineering Task Force, Mar. 25, 1999). Thus codec selection, logical channel opening and closing, and other H.323 signaling messages that require action by media gateway 32 are translated to a gateway control protocol by media gateway controller 38 and sent to media gateway 32.

When a network is configured as shown in the embodiment of FIG. 5, various advantages of the invention are evident. H.323 endpoint 30 believes that it is communicating with an H.323-compliant system, and yet media gateway controller 38 is the only other element in the configuration that needs to understand H.323 signaling. For proper interfacing with H.323 endpoint 30, media gateway bank 34 need only be able to utilize one or more of the codecs specified by H.323 (e.g., G.711, G.722, G.723, G.728, and G.729 at various bit rates) with RTP/RTCP (Real-time Transport Protocol/RTP Transport Control Protocol). And signaling gateway bank 42 need only be able to peer TCP connections. Since the H.323 understanding is concentrated in one highly flexible call agent (media gateway controller 38), new features can be added easily and rapidly to the system at controller 38, while the media gateways of bank 34 and the signaling gateways of bank 42 remain fairly simple.

A second advantage achieved by this system is scalability. For large-scale network solutions, it is preferable that the call agent intelligence be concentrated in a single platform. The distribution of H.323 signaling connections among a bank of relatively simple signaling gateways makes the system scalable, whereas scalability options are limited if all H.323 signaling connections must be made directly to media gateway controller 38.

Figure 6:
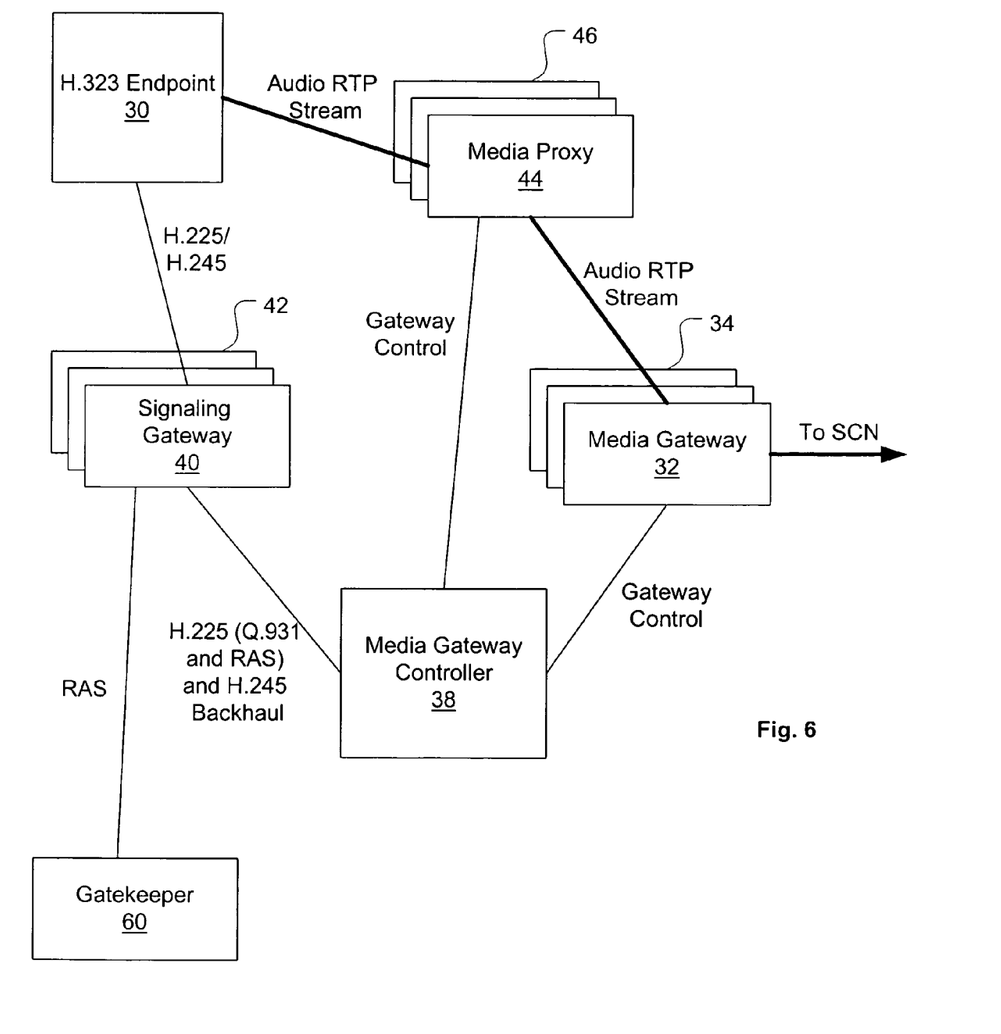
FIG. 6 shows a second embodiment of the invention additionally utilizing a media proxy.

FIG. 6 illustrates a second network configuration according to an embodiment of the invention. Media proxy 44 (e.g., one of a bank of such proxies 46) is inserted between H.323 endpoint 30 and media gateway 32. A carrier can use this embodiment to interface with other carriers, as it presents an H.323-compliant inter-carrier interface to another carrier hosting H.323 endpoint 30. This embodiment retains the functionality of the previous embodiment, while preventing H.323 endpoint 30 from seeing the internal structure of its points of presence (e.g., gateway bank 34). Also, media proxy bank 46 can be used to perform media conversion when the networks have different quality-of-service requirements. An additional advantage of this configuration is that H.323 signaling is terminated at the borders of the network, allowing most intra-carrier communications to rely on more efficient and less complex protocols.

Figure 7:
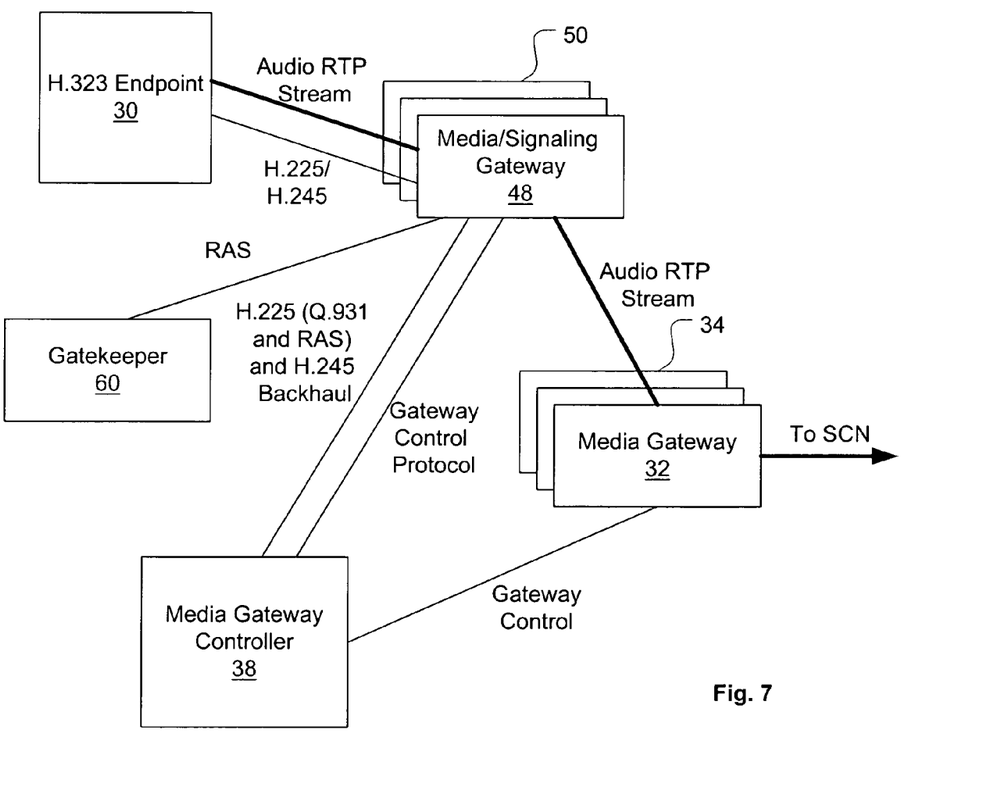
FIG. 7 depicts a third embodiment of the invention utilizing a combined media proxy and signaling gateway.

Because the processing requirements for the signaling gateways are relatively undemanding, it may be preferable to implement a media endpoint and a signaling gateway on the same platform. For instance, FIG. 7 shows a combined media/signaling gateway 48, one of a bank 50 of such gateways. Gateway 48 appears to H.323 endpoint 30 as a peer endpoint for both media and signaling. However, gateway 48 backhauls H.225 and H.245 signaling to media gateway controller 38 for handling. With this embodiment, associated H.323 signaling and bearer streams can be constrained to terminate on the same platform, simplifying controller 38's tasks and reducing the amount of hardware required by an implementation. Each gateway 48 will generally be simpler—while offering more features—by off-loading H.323 signaling onto controller 38.

Figure 8:
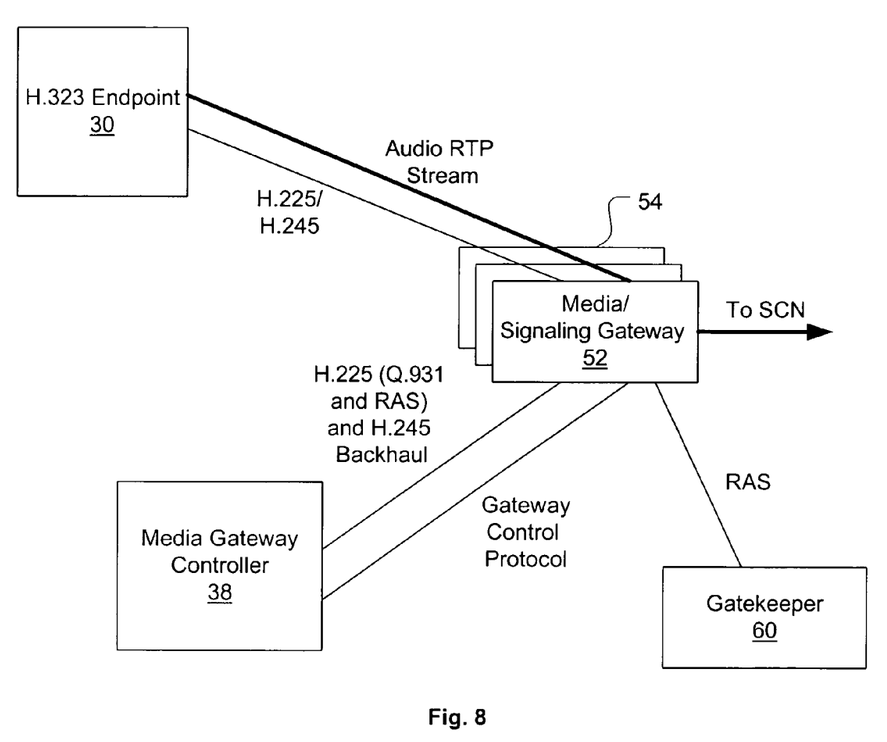
FIG. 8 shows a fourth embodiment of the invention where a media gateway also acts as a signaling gateway.

FIG. 8 depicts a network configuration with a combined media gateway/signaling gateway 52, one of a bank 54 of such gateways. Like gateway 48 of FIG. 7, gateway 52 peers both media and signaling for H.323 calls. This embodiment has the same general advantages as the embodiment of FIG. 7.

The present invention also allows for fault tolerance in an H.323 system. In prior art configurations (see FIG. 4), if media gateway controller 38 experienced a fault that broke its TCP connections, all H.323 calls would be torn down, even if their bearer streams could continue functioning. No mechanism for making the media gateway controller fault-tolerant was possible.

Figure 9:
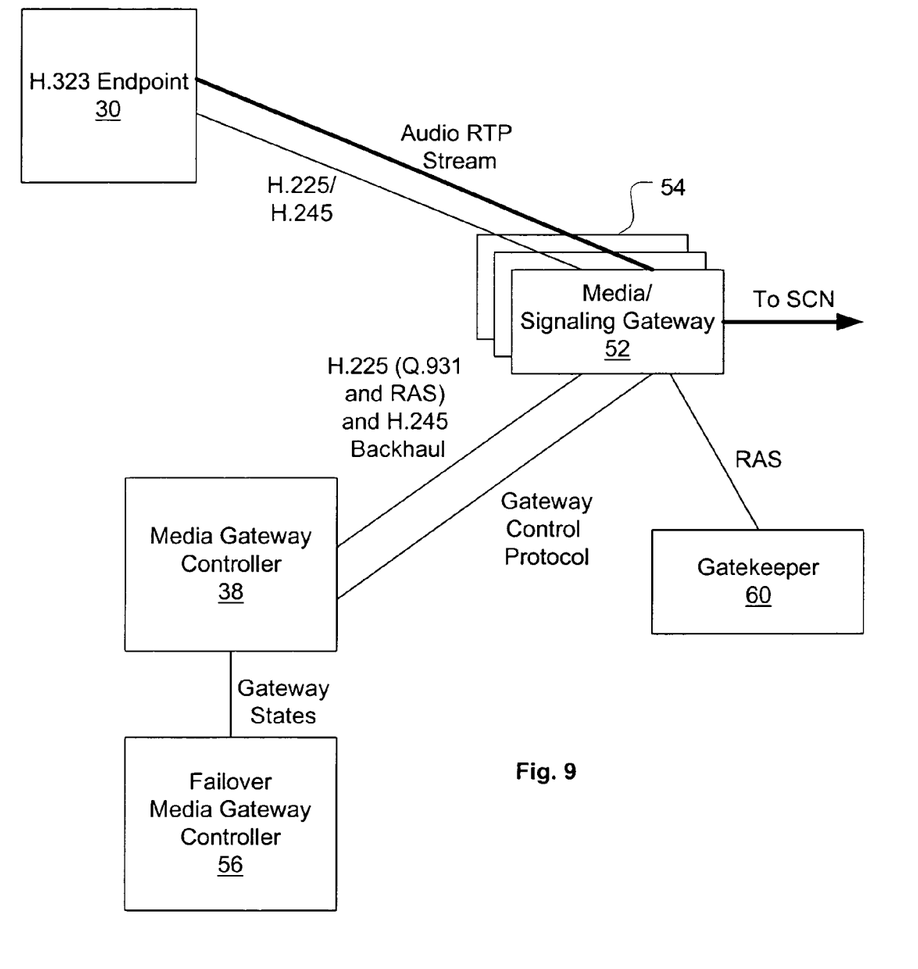
FIG. 9 illustrates a fifth embodiment of the invention that includes failover functionality.

FIG. 9 shows one fault-tolerant application of the present invention. In this embodiment, media gateway controller 38 is the primary controller. However, a second, failover media gateway controller 56 shadows the primary controller. For instance, controller 38 can periodically send updates of its gateway and call states to controller 56. If controller 38 fails, backhaul and gateway control can be switched to controller 56. Because the H.225 and H.245 TCP connections are not affected by failure of the platform actually handling the H.225 and H.245 signaling, the system is fault-tolerant.

Note that general procedures for implementing gateway controller fault tolerance with other types of signaling are known in the art. For instance, redundant Media Gateway Controllers can be recognized by gateways and proxies by inserting a "Session Manager" protocol between the H.323 backhaul application and RUDP (see INTERNET DRAFT, SESSION MANAGER, Internet Engineering Task Force, Feb. 25, 1999 for one example; SCTP is another).

Figure 10:
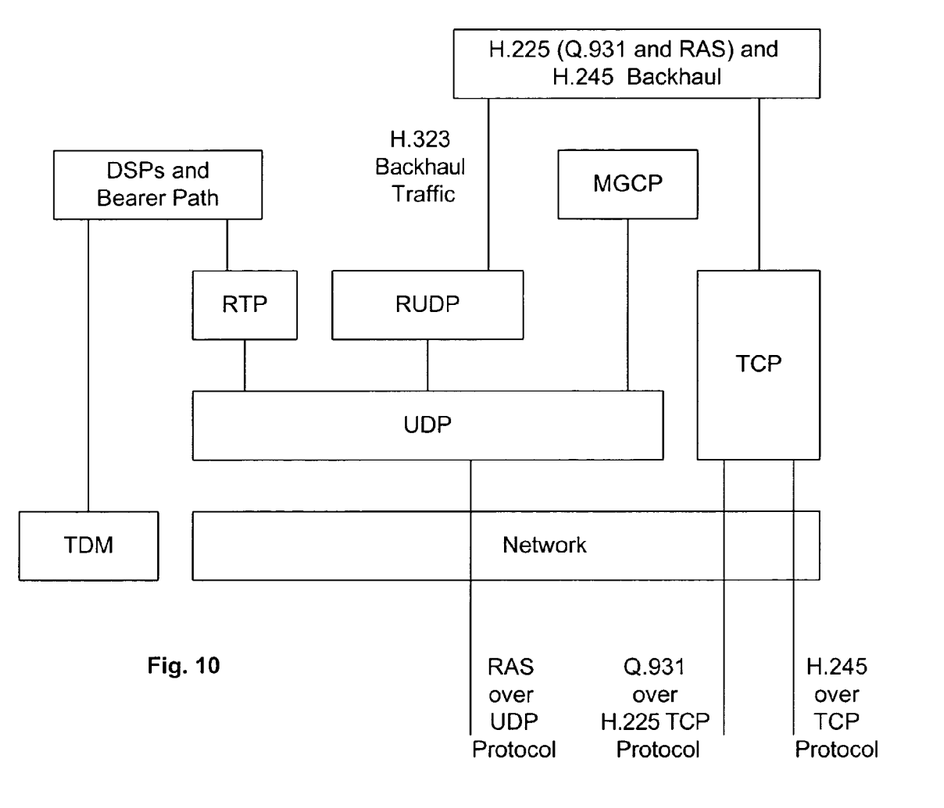
FIGS. 10 and 11 illustrate, respectively, protocol stacks for a media gateway/signaling gateway and a media gateway controller according to embodiments of the invention.

Turning now to the signaling gateway implementation, FIG. 10 illustrates one possible protocol stack for a TDM media gateway having a co-resident H.323 signaling gateway, e.g., like gateway 52 of FIG. 8. TCP functionality provides a means for terminating H.225 (both Q.931 and RAS) and H.245 signaling connections. The H.225/H.245 Backhaul performs several functions: it multiplexes the signaling content received over the H.225 and H.245 signaling connections onto a single RUDP session; and it parses multiplexed signaling content passing in the opposite direction into multiple datagrams and transmits each datagram over it appropriate H.225 or H.245 TCP connection. RUDP is used for the backhaul session between the gateway and an attached media gateway controller. Note that the gateway also maintains an MGCP session with the gateway controller. Various other protocols (such as SCTP for backhaul) can be used to perform these functions in other systems according to the invention. And future versions of H.323 may pass H.225 and H.245 signaling information with a UDP-based protocol that can also be integrated into the backhaul protocol.

Figure 11:
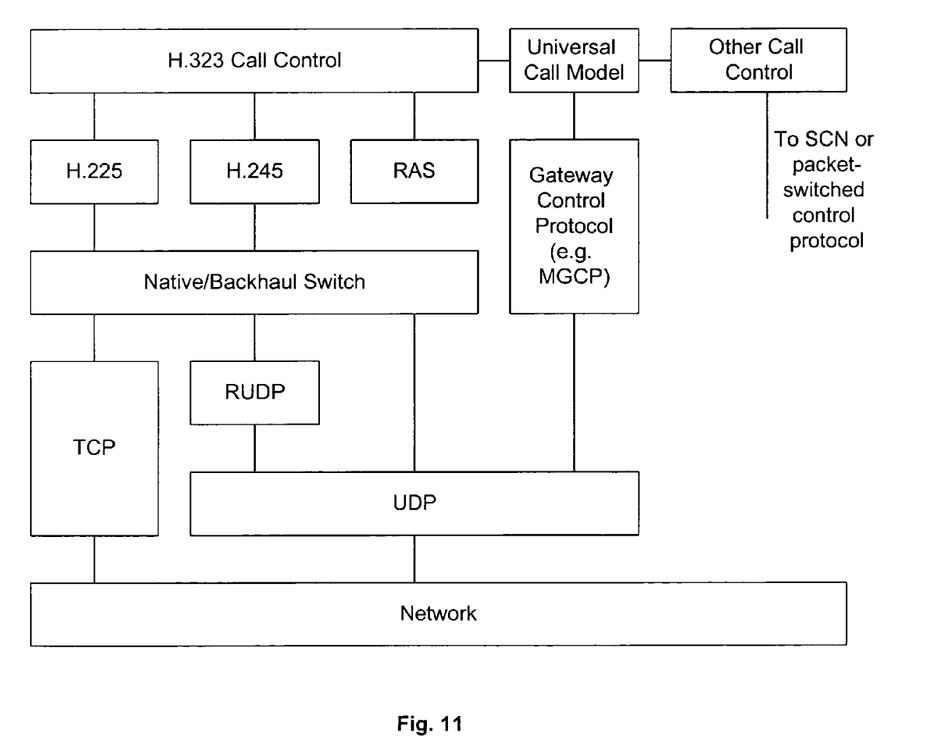

FIG. 11 illustrates one possible protocol stack that can be used with H.323 backhaul for a media gateway controller. This particular embodiment incorporates a native/backhaul switch that allows the media gateway controller to accept both direct (i.e. "native") H.323 TCP signaling connections and backhauled H.323 signaling connections. Essentially, this switch decides on a call-by-call basis where outgoing signaling is to be sent. When the TCP connections are handled directly, H.225 and H.245 messages are passed directly over TCP; otherwise, the messages are multiplexed onto an RUDP session for transmission to the appropriate signaling gateway.

When a multiplexed message stream is received from a signaling gateway, the native/backhaul switch parses the message content into H.225 and H.245 signaling content and identifies each message with its appropriate call signaling connection.

The H.323 call control module handles originating and/or terminating signaling for the H.323 protocol stack. When communication with a gateway or another signaling protocol is required, the signaling is passed through a universal call model for translation to either MGCP messages and/or signaling for another signaling protocol.

The disclosed embodiments presented herein are exemplary. The embodiments can be used with a variety of network protocols, and are appropriate for both LAN and WAN usage. The transport protocols, signaling protocols, control protocols, etc. used in a specific implementation will to some extent depend on the requirements of that implementation. Various other modifications to the disclosed embodiments will be obvious to those of ordinary skill in the art upon reading this disclosure, and are intended to fall within the scope of the invention as claimed.

What is claimed is:

1. A method of controlling packet-switched calls, comprising:
    terminating a plurality of call signaling connections, each corresponding to one of a plurality of packet-switched calls, at a packet-switched signaling gateway, where each call signaling connection is packet-switched;
    communicating, over a number of sessions smaller than the plurality of call signaling connections, the signaling content of the call signaling connections from the signaling gateway to a primary media gateway controller;
    routing a plurality of packet-switched bearer streams, each corresponding to one of the packet-switched calls, to a media endpoint controlled by the primary media gateway controller, wherein the media endpoint is a media proxy;
    forwarding one of the packet-switched bearer streams from the media proxy to a media gateway also controlled by the primary media gateway controller; and
    prior to the forwarding, modifying the format of the forwarded packet-switched bearer stream within the media proxy.

2. The method of claim 1, wherein the media endpoint is a media gateway.

3. The method of claim 1, wherein the signaling gateway and the media endpoint co-reside on a same platform.

4. The method of claim 1, further comprising:
    periodically saving call state information for the calls served by the primary media gateway controller to a failover media gateway controller; and upon an occurrence of a failure at the primary media gateway controller, failing over to the failover media gateway controller both control of the media endpoint and communication with the signaling gateway.

5. The method of claim 1, wherein one of the packet-switched bearer streams is an audio stream.

6. The method of claim 5, further comprising routing a packet-switched video stream associated with the audio stream to the media endpoint controlled by the primary media gateway controller.

7. A method of controlling packet-switched calls, comprising:
   terminating a plurality of call signaling connections, each corresponding to one of a plurality of packet-switched calls, at a packet-switched signaling gateway, where each call signaling connection is packet-switched;
   communicating, over a number of sessions smaller than the plurality of call signaling connections, a signaling content of the plurality of call signaling connections from the signaling gateway to a primary media gateway controller;
   routing a plurality of packet-switched bearer streams, each corresponding to one of the packet-switched calls, to a media endpoint controlled by the primary media gateway controller;
   multiplexing, at the primary media gateway controller, outbound signaling content destined for the packet-switched call signaling connections terminated by the signaling gateway, onto the smaller plurality of sessions with the signaling gateway;
   parsing, at the signaling gateway, the outbound signaling content into protocol data units identifiable with their associated call-signaling connections; and
   transmitting each protocol data unit over its associated call-signaling connection, using a native transport protocol appropriate to that signaling connection.

8. The method of claim 7, wherein the native transport protocol utilized for the call-signaling connections comprises TCP.

9. The method of claim 7, wherein the native transport protocol utilized for the call-signaling connections comprises UDP.

10. The method of claim 7, wherein a native transport protocol utilized for the call-signaling connections comprises TCP.

11. The method of claim 7, wherein a native transport protocol utilized for the call-signaling connections comprises UDP.

12. A packet-switched signaling gateway, comprising:
   means for terminating a plurality of call signaling connections, each corresponding to one of a plurality of packet-switched calls, where each call signaling connection is packet-switched;
   means for multiplexing signaling content received over the plurality of call signaling connections onto a smaller number of packet-switched sessions for transmission to a media gateway controller;
   means for receiving the multiplexed signaling content from the media gateway controller; and
   means for parsing the multiplexed signaling content into multiple protocol data units and transmitting each protocol data unit over its appropriate packet-switched call signaling connection.

13. The packet-switched signaling gateway of claim 12, wherein the packet-switched call signaling connections include H.225 Q.931 connections, H.225 RAS connections, and H.245 connections.

14. The signaling gateway of claim 12, wherein the smaller number is one.

15. The signaling gateway of claim 12, wherein the transport protocol used by the multiplexing means for a single session is selected from the group of protocols consisting of TCP and RUDP.

16. The signaling gateway of claim 12, further comprising:
   means for terminating a packet-switched bearer stream associated with one of the packet-switched call signaling connections.

17. The signaling gateway of claim 16, wherein the transport protocol used by the terminating means for the plurality of packet-switched call signaling connections comprises TCP.

18. The signaling gateway of claim 17, wherein the transport protocol used by the multiplexing means for a single session is selected from the group of protocols consisting of TCP, SCTP, and RUDP.

19. The signaling gateway of claim 16, wherein the transport protocol used by the terminating means for each of the plurality of packet-switched call signaling connections is selected from the group of protocols consisting of TCP, SCTP, and RUDP.

20. The signaling gateway of claim 19, further comprising:
   means for receiving gateway control signaling from the media gateway controller; and control means responsive to received gateway control signaling.

21. A media gateway controller comprising:
   means for receiving multiplexed signaling content from a signaling gateway and parsing this content into signaling content associated with identifiable call signaling connections, each corresponding to one of a plurality of packet-switched calls, where each call signaling connection is packet-switched;
   means for sending, for the signaling content associated with one of the identifiable call signaling connections, gateway control signaling responsive to that signaling content, to a media termination endpoint handling a packet-switched bearer stream associated with that identifiable call-signaling connection; and
   multiplexing means for assembling outbound signaling content—destined for the packet switched call signaling connections terminated by the signaling gateway—onto a number of sessions smaller than a number of terminated call signaling connections for transmission to the signaling gateway.

22. A packet-switched communication system comprising:
   a plurality of signaling gateways, each signaling gateway capable of terminating a plurality of call signaling connections—each connection corresponding to one of a plurality of packet-switched calls—and multiplexing the signaling content of the call signaling connections onto a number of sessions smaller than a number of terminated call signaling connections, where each call signaling connection is packet-switched;
   a plurality of media endpoints, which comprises both media gateways and media proxies, with each endpoint capable of terminating a plurality of packet-switched bearer streams; and
   a set of one or more primary media gateway controllers, the set of primary media gateway controllers in communication with each of the signaling gateways and each of the media endpoints, the media gateway controllers using multiplexed signaling content received from the plurality of signaling gateways to control operation of the media endpoints.

23. The packet-switched communication system of claim 22, further comprising a failover media gateway controller that periodically receives call state information from one of the primary media gateway controllers, and takes over communication with one of the plurality of signaling gateways or media endpoints upon failure of that primary media gateway controller with respect to that gateway or endpoint.

24. The packet-switched communication system of claim 22, further comprising a set of one or more failover media gateway controllers that periodically receive call state information from the set of primary media gateway controllers, and takes over communication with a signaling gateway or media endpoint upon failure of one of the primary media gateway controllers with respect to that gateway or endpoint.

25. The packet-switched communication system of claim 22, wherein at least one of the signaling gateways co-resides with one of the media endpoints on a common platform.

26. The packet-switched communication system of claim 22, wherein the packet-switched call signaling connections terminated by at least one of the signaling gateways comprise at least one TCP connection.

27. A method of controlling packet-switched calls, comprising:
    terminating a plurality of call signaling connections, each corresponding to one of a plurality of packet-switched calls, at a packet-switched signaling gateway, where each call signaling connection is packet-switched;
    communicating, over a number of sessions smaller than the plurality of call signaling connections, a signaling content of the call signaling connections from the signaling gateway to a primary media gateway controller;
    routing a plurality of packet-switched bearer streams, each corresponding to one of the packet-switched calls, to a media endpoint controlled by the primary media gateway controller, wherein the media endpoint is a media proxy;
    forwarding one of the packet-switched bearer streams from the media proxy to a media gateway also controlled by the primary media gateway controller; and
    prior to the forwarding, modifying a format of the packet-switched bearer stream to be forwarded within the media proxy;
    wherein an H.323 backhaul channel is used when communicating the signaling content of the call signaling connections from the signaling gateway to the primary media gateway controller.

28. The method of claim 27, wherein the smaller number of sessions is one session.

29. The method of claim 27, further comprising interpreting, at the primary media gateway controller, the signaling content.

30. The method of claim 29, further comprising issuing gateway control commands, from the primary media gateway controller to the media endpoint, based on the signaling content.

31. The method of claim 27, wherein the primary media gateway controller similarly controls multiple media endpoints and similarly communicates with multiple signaling gateways.

32. The method of claim 31, wherein the routing includes routing some of the packet-switched bearer streams to one of the multiple media endpoints, and some others of the packet-switched bearer streams to another of the multiple media endpoints.

33. The method of claim 27, wherein the media endpoint is a media proxy.

34. The method of claim 27, wherein the media endpoint is a media gateway.

35. The method of claim 27, wherein the signaling gateway and the media endpoint co-reside on a same platform.

36. The method of claim 27, further comprising: periodically saving call state information for the calls served by the primary media gateway controller to a failover media gateway controller; and
    upon an occurrence of a failure at the primary media gateway controller, failing over to the failover media gateway controller both control of the media endpoint and communication with the signaling gateway.

37. The method of claim 27, wherein one of the packet-switched bearer streams is an audio stream.

38. The method of claim 37, further comprising routing a packet-switched video stream associated with the audio stream to the media endpoint controlled by the primary media gateway controller.

39. A method of controlling packet-switched calls, comprising:
    terminating a plurality of call signaling connections, each corresponding to one of a plurality of packet-switched calls, at a packet-switched signaling gateway, where each call signaling connection is packet-switched;
    communicating, over a number of sessions smaller than the plurality of call signaling connections, a signaling content of the call signaling connections from the signaling gateway to a primary media gateway controller;
    routing a plurality of packet-switched bearer streams, each corresponding to one of the packet-switched calls, to a media endpoint controlled by the primary media gateway controller;
    multiplexing, at the primary media gateway controller, outbound signaling content destined for the packet-switched call signaling connections terminated by the signaling gateway, onto the smaller number of sessions with the signaling gateway;
    parsing, at the signaling gateway, the outbound signaling content into protocol data units identifiable with their associated call-signaling connections; and
    transmitting each protocol data unit over its associated call-signaling connection, using a native transport protocol appropriate to that signaling connection;
    wherein an H.323 backhaul channel is used when communicating the signal content of the call signaling connections from the signaling gateway to the primary media gateway controller.

40. The method of claim 39, wherein the native transport protocol utilized for the call-signaling connections comprises TCP.

41. The method of claim 39, wherein the native transport protocol utilized for the call-signaling connections comprises UDP.

42. The method of claim 39, wherein a native transport protocol utilized for the call-signaling connections comprises TCP.

43. The method of claim 39, wherein a native transport protocol utilized for the call-signaling connections comprises UDP.

44. A packet-switched signaling gateway comprising:
    means for terminating a plurality of call signaling connections, each corresponding to one of a plurality of packet-switched calls, where each call signaling connection is packet-switched;
    means for multiplexing signaling content received over the plurality of call signaling connections onto a smaller number of packet-switched sessions for transmission over an H.323 backhaul channel to a media gateway controller;

means for receiving multiplexed signaling content from the media gateway controller; and means for parsing the multiplexed signaling content into multiple protocol data units and transmitting each protocol data unit over its appropriate packet-switched call signaling connection.

45. The packet-switched signaling gateway of claim 44, wherein the packet-switched call signaling connections include 11.225 Q.931 connections, H.225 RAS connections, and H.245 connections.

46. The signaling gateway of claim 44, wherein the smaller number is one.

47. The signaling gateway of claim 44, wherein a transport protocol used by the terminating means for the plurality of packet-switched call signaling connections comprises TCP.

48. The signaling gateway of claim 47, wherein the transport protocol used by the multiplexing means for a single session is selected from the group of protocols consisting of TCP, SCTP, and RUDP.

49. The signaling gateway of claim 44, wherein the transport protocol used by the terminating means for each of the plurality of packet-switched call signaling connections is selected from the group of protocols consisting of TCP, SCTP, and RUDP.

50. The signaling gateway of claim 44, wherein the transport protocol used by the multiplexing means for the single session is selected from the group of protocols consisting of TCP and RUDP.

51. The signaling gateway of claim 44, further comprising:
means for terminating a packet-switched bearer stream associated with one of the packet-switched call signaling connections.

52. The signaling gateway of claim 51, further comprising:
means for receiving gateway control signaling from the media gateway controller; and
control means responsive to the received gateway control signaling.

53. A media gateway controller comprising:
means for receiving multiplexed signaling content over an H.323 backhaul channel from a signaling gateway and parsing this content into signaling content associated with identifiable call signaling connections, each corresponding to one of a plurality of packet-switched calls, where each call signaling connection is packet-switched; and
means for sending, for the signaling content associated with one of the identifiable call signaling connections, gateway control signaling responsive to that signaling content, to a media termination endpoint handling a packet-switched bearer stream associated with that identifiable call-signaling connection; and
multiplexing means for assembling outbound signaling content—destined for the packet-switched call signaling connections terminated by the signaling gateway—onto a number of sessions smaller than a number of terminated call signaling connections for transmission to the signaling gateway.

54. A packet-switched communication system comprising:
a plurality of signaling gateways, each signaling gateway capable of terminating a plurality of call signaling connections—each connection corresponding to one of a plurality of packet-switched calls—and multiplexing the signaling content of the call signaling connections onto a number of sessions smaller than a number of terminated call signaling connections, where each call signaling connection is packet-switched;
a plurality of media endpoints, which comprises both media gateways and media proxies, with each endpoint capable of terminating a plurality of packet-switched bearer streams; and
a set of one or more primary media gateway controllers, the set of primary media gateway controllers in communication with each of the signaling gateways through H.323 backhaul channels and each of the media endpoints, the primary media gateway controllers using multiplexed signaling content received from the plurality of signaling gateways to control operation of the media endpoints.

55. The packet-switched communication system of claim 54, further comprising a failover media gateway controller that periodically receives call state information from one of the primary media gateway controllers, and takes over communication with a signaling gateway or media endpoint upon failure of that primary media gateway controller with respect to that gateway or endpoint.

56. The packet-switched communication system of claim 54, further comprising a set of one or more failover media gateway controllers that periodically receive call state information from the set of primary media gateway controllers, and takes over communication with a signaling gateway or media endpoint upon failure of one of the primary media gateway controllers with respect to that gateway or endpoint.

57. The packet-switched communication system of claim 54, wherein at least one of the signaling gateways co-resides with one of the media endpoints on a common platform.

58. The packet-switched communication system of claim 54, wherein the packet-switched call signaling connections terminated by at least one of the signaling gateways comprise at least one TCP connection.

* * * * *

UNITED STATES PATENT AND TRADEMARK OFFICE
CERTIFICATE OF CORRECTION

PATENT NO.       : 7,539,179 B1  
APPLICATION NO.  : 09/409922  
DATED            : May 26, 2009  
INVENTOR(S)      : Randall Baird It is certified that error appears in the above-identified patent and that said Letters Patent is hereby corrected as shown below:

At column 10, line 24, please delete "claim 19," and insert -- claim 12, --.

Signed and Sealed this

Twenty-second Day of December, 2009

David J. Kappos  
*Director of the United States Patent and Trademark Office*